Patented Mar. 5, 1940

2,192,194

UNITED STATES PATENT OFFICE 2,192,194

PROCESS FOR MANUFACTURING ARTIFICIAL FIBER FROM PROTEIN CONTAINED IN SOYA BEAN

Toshiji Kajita and Ryohei Inoue, Tokyo, Japan, assignors, by mesne assignments, to Showa Sangyo Kabushiki Kaisha, Yokohama, Japan, a body corporate of Japan No Drawing. Application September 8, 1937, Serial No. 162,955. In Japan July 29, 1937

5 Claims. (Cl. 18—54)

The invention relates to a process of manufacturing artificial fiber from protein contained in soya bean and consists in extracting the protein, with dilute alkaline solution, from the residue of the soya bean after the oil content has been extracted. The protein is then precipitated by adding acids or metallic salts thereof to said solution. The precipitate is washed with water, allowing a suitable amount of water to remain with the precipitate. Lecithin is added thereto and then the mixture is dissolved in alkaline solution. The resulting solution is then allowed to mature after which the solution thus obtained is spun into an acid bath which may contain suitable organic coagulating agents. The object of this invention is to obtain a fiber of remarkably increased tensile strength and to employ the lecithin as stabilizer.

The invention described in our copending application Serial No. 162,954 relates to the process of manufacturing artificial fiber from protein contained in the soya bean, consisting in protein, with dilute alkaline solution, from the residue of soya bean from which the oil content has been extracted, precipitating the protein by adding acids or metallic salts to said solution, washing said precipitate with water, allowing a suitable amount of water to remain with the precipitate and adding a stabilizer such as sugar or tartaric acid and then dissolving the said mixture in alkaline solution. The resulting solution is then submitted to maturing, and the solution thus obtained is spun into an acid bath which may contain suitable organic coagulating agents. In the present invention, on the other hand, lecithin is used as a stabilizer instead of sugar or tartaric acid as used in said application Serial No. 162,954. Lecithin as used in the present invention acts not only as stabilizer, but also it has the advantage that the tensile strength of the fiber produced is remarkably increased.

One example of carrying the invention into practice is as follows:

The residue of the soya bean from which the oil content has been extracted, is subjected to extraction with an alkaline solution diluted 5 to 10 times by weight, for example, 0.2 to 2% of ammonia solution or caustic alkaline solution at a temperature of 20° to 30° C., for about 2 to 5 hours, whereby the protein amounting to 10 to 20% of the total amount of the raw material may be extracted. The protein thus obtained is purified by adding a dilute solution of hydrogen peroxide or sodium peroxide and bone charcoal or China clay and then filtered. To the transparent solution thus obtained, a solution containing 10 to 15% of acids such as acetic acid, sulphuric acid, phosphoric acid, etc., or a 30 to 40% solution of metallic salts of acids, for example, copper sulphate, zinc sulphate, zinc acetate, copper acetate is added until the solution becomes weakly acidic whereby the protein or proteic salt is precipitated. The precipitate thus obtained is thoroughly washed with water to remove adhering salts and acids and separated by filtering. Then lecithin is added at the rate of 0.01 to 0.02% to said precipitate which contains 75 to 85% of water and subsequently said mixture is mixed in an alkaline solution of 25 to 40% in concentration which corresponds to 3 to 7% of the protein content, whereby a colloidal solution is produced. Then, by filtering and removing bubbles, and maturing the solution mentioned at the temperature of 10° to 20° C. for 2 to 3 days, a spinning solution is obtained. This spinning solution is then spun in the usual manner or allowed to fall into an acid bath of 10 to 50% concentration or an acid bath containing in addition 10 to 20% of an organic coagulating agent such as alcohol, formaldehyde, acetone, etc., then submitted to the finishing procedure.

According to the present invention a proteic artificial fiber of superior quality resembling wool or natural silk with a remarkable tensile strength and which does not degenerate can be obtained.

What we claim is:

1. The process of manufacturing artificial fiber from protein contained in the soya bean, consisting in extracting the protein with dilute alkaline solution from the residue of the soya bean from which the oil content has been extracted, precipitating the protein by adding a substance selected from the group consisting of acids and the metal salts thereof to said solution, washing said precipitate with water, adding lecithin while the precipitate is wet dissolving the said mixture in an alkaline solution, permitting the resulting solution to mature, spinning the solution thus obtained into an acid bath.

2. The process of manufacturing artificial fiber from protein contained in the soya bean, consisting in extracting the protein with dilute alkaline solution from the residue of the soya bean from which the oil content has been extracted, precipitating the protein by adding an acid to said solution, washing said precipitate with water, adding lecithin while the precipitate is wet, dissolving the said mixture in an alkaline solution, permitting the resulting solution to mature, spinning the solution thus obtained into an acid bath.

3. The process of manufacturing artificial fiber from protein contained in the soya bean, consisting in extracting the protein with dilute alkaline solution from the residue of the soya bean from which the oil content has been extracted, precipitating the protein by adding an acid to said solution, washing said precipitate with water, adding lecithin while the precipitate is wet, dissolving the said mixture in an alkaline solution, permitting the resulting solution to mature, spinning the solution thus obtained into an acid bath, containing organic coagulating agents.

4. The process of manufacturing artificial fiber from protein contained in the soya bean, consisting in extracting the protein with dilute alkaline solution from the residue of the soya bean from which the oil content has been extracted, precipitating the protein by adding a metallic salt to said solution, washing said precipitate with water, adding lecithin while the precipitate is wet, dissolving the said mixture in an alkaline solution, permitting the resulting solution to mature, spinning the solution thus obtained into an acid bath.

5. The process of manufacturing artificial fiber from protein contained in the soya bean, consisting in extracting the protein with dilute alkaline solution from the residue of the soya bean from which the oil content has been extracted, precipitating the protein by adding a metallic salt to said solution, washing said precipitate with water, adding lecithin while the precipitate is wet, dissolving the said mixture in an alkaline solution, permitting the resulting solution to mature, spinning the solution thus obtained into an acid bath containing organic coagulating agents.

TOSHIJI KAJITA.
RYOHEI INOUE.